Patented Jan. 18, 1938

2,105,952

UNITED STATES PATENT OFFICE 2,105,952

COMPOSITIONS OF MATTER

William Henry Moss, London, England, assignor to Celanese Corporation of America, a corporation of Delaware No Drawing. Application October 29, 1935, Serial No. 47,226. In Great Britain August 24, 1933

17 Claims. (Cl. 106—40)

This invention relates to improvements in compositions of matter, to their use in the manufacture of articles, and to the articles obtained.

This application is a continuation-in-part of my U. S. application S. No. 739,238 filed 10th August, 1934.

It has been discovered that compounds of the type of phenoxy-acetins and phenyl-acetins, i. e. compounds which are esters of polyhydric alcohols, e. g. glycol and glycerine, with aryl-substituted fatty or other aliphatic acids may be employed as plasticizers for cellulose derivative and other plasticizable organic base materials, and yield compositions which, while possessing high flexibility, may nevertheless be hard and free from stickiness. Coated and other articles may thus be obtained by means of such compositions which are highly flexible and yet present considerable resistance to wear.

The invention is concerned only with aryl substituted aliphatic acid esters formed from polyhydric alcohols consisting of a substituted hydrocarbon chain comprising at least two substituent hydroxyl groups.

The compositions are of particular value as coating compositions and especially as coating compositions for electric cables and similar articles in which high flexibility is of great importance. The use of the compositions as outer coatings on cables and other articles protected by undercoatings of compositions containing a suitable base and a high proportion of a plasticizer or mixture of plasticizers of high solvent power for said base is claimed in application S. No. 739,238 of which the present application is a continuation-in-part.

The base of the new compositions may be any suitable cellulose derivative, e. g. organic esters of cellulose such as cellulose acetate, cellulose formate, cellulose propionate, cellulose butyrate or higher members of this series, other cellulose esters, mixed cellulose esters as, for example, cellulose nitro-acetate and cellulose acetate propionate, inorganic derivatives of cellulose such as cellulose nitrate, cellulose ethers, as for example ethyl, methyl or benzyl cellulose, or mixed ethers, or mixed ether-esters of cellulose, as for example ethyl cellulose acetate. Polyvinyl compounds may also be employed as the base of the compositions, e. g. polymerized vinyl acetate, or mixtures of polyvinyl compounds with cellulose derivatives may be employed. However, this invention is of particular value in connection with compositions having a basis of acetone-soluble cellulose acetate.

Particularly valuable plasticizers for use according to this invention are phenyl-acetins and phenoxy-acetins, and especially triphenyl acetin, i. e. the tri-ester of glycerine with phenyl-acetic acid, which is a plasticizer which is of limited solvent power for the cellulose acetate and yet has a very high compatibility. Valuable plasticizers may also be obtained by the esterification of glycerine with mixtures of acetic and phenylacetic acids. Other similar plasticizers are the phenoxy-acetins, e. g. glycerine mono-acetate di-phenoxy-acetate, and the mixed esters of glycol with acetic and phenyl-acetic or phenoxyacetic acids.

The new plasticizers are, in general, highly compatible with the cellulose derivative or other base, e. g. compatible to the extent of over 100 to 200% or even up to 300 to 400% on the weight of the base, and may be present in the compositions in any suitable proportions, e. g. 100%, 150% or 200% or more on the weight of the base, or proportions less than 100%. It is found that compositions containing high proportions of the new plasticizers may be highly flexible and yet be harder than compositions containing the same or lower proportions of different plasticizers. Thus a composition containing 100 parts of acetone-soluble cellulose acetate and 160 parts of triphenyl acetin is harder than one containing 100 parts of acetone-soluble cellulose acetate, 50 parts of triphenyl acetin and 90 parts of the isomeric xylene monomethyl sulphonamides.

The new compositions may also contain solvents for the base thereof. Thus solvents or mixtures of solvents of low, medium or high boiling point may be incorporated in the compositions so as to obtain compositions which are flowable at ordinary temperatures. Among suitable solvents for this purpose are acetone, methyl acetate, alcohol, benzene, methyl ethyl ketone, ethylene dichloride or mixtures thereof as volatile solvents, and dioxane, ethyl lactate and ethers and ether-esters of ethylene glycol, e. g. methyl glycol and methyl glycol mono-acetate as medium boiling solvents.

Natural, semi-synthetic, or synthetic resins may also be included in the compositions, e. g. to improve their strength, and, especially where the compositions are to be used directly for coating purposes, to increase their adhesive properties. Synthetic resins may also have a beneficial action on the compatibility of the plasticizer and cellulose derivative in the compositions, and may enable increased quantities of plasticizer to be used without danger of the plasticizer blooming out. Among synthetic resins suitable for use in accordance with this invention are those obtainable by the condensation of phenols and aldehydes or ketones, e. g. phenol formaldehyde and phenol furfural resins and particularly condensation products of the complex phenols such as diphenylol propane, for example diphenylol propane-formaldehyde resins, diphenylol propane-acetone resins, diphenylol propane-furfural resins. Amongst other resins suitable for use in accordance with the present invention may be mentioned furfural-ketone resins, furfural-amine resins, resins obtainable by the condensation of aldehydic or ketonic substances with aromatic amino or aryl sulphonamide or N-amino substituted aryl sulphonamide compounds, resins derived from the condensation of ureas or thio-ureas with aldehydic substances with or without phenolic bodies, lactic acid resins, sulphurized phenol resins and resins obtainable by the polymerization of aldehydes or vinyl compounds. In general when synthetic resins are present in the compositions it is preferred to use up to about 30% to 40% of synthetic resin based on the weight of cellulose derivative present, but higher percentages may in some cases be used.

As stated above the new compositions are of particular value in coating articles and, for such purposes, the application of the composition may be effected in a variety of ways. Thus the articles may be passed directly through a bath containing the molten or dissolved composition and any excess removed from the articles by any suitable means. Again, the compositions may be dissolved in solvents and applied by brushing or spraying. In applying the compositions and particularly the compositions dissolved in volatile solvents, it is advisable to apply a number of relatively thin coatings and to dry each coating before the application of the next coating.

The compositions may be employed for coating articles of various characters and are of particular value in coating rubber-surfaced articles and other articles where flexibility is required, e. g. Bowden cables. The compositions may be applied to tapes, ribbons, films or fabrics, and these may be of any suitable material, e. g. cellulose acetate or other cellulose derivative, silk, cotton or regenerated cellulose, and may be woven, knitted or netted, and the tape may be of the so-called bias type. Furthermore, it has been found that products of high flexibility may be obtained by employing, for example, a warp of threads, say thousands of threads aligned side-by-side, or a relatively limited number of threads close together, and doping the same with a composition so that on drying they adhere to each other and form a fabric or tape. If desired, such a warp or collection of individual threads may be held together at more or less long intervals by suitable wefts.

When tapes or other materials containing a cellulose derivative are coated with solutions of the new compositions, precaution should be taken to avoid any deleterious action on such material by the solvents or the like present. Thus a tape having a basis of cellulose acetate may be coated with a composition comprising ethyl cellulose in a medium which is not a solvent for cellulose acetate.

The following are examples of suitable compositions which may be employed according to the present invention. If it is desired to employ them in solution, a suitable solvent medium consists of about 400 parts of acetone, 160–180 parts of alcohol and 240–220 parts of benzene per 100 parts of cellulose derivative.

*Example 1*

| | Parts |
|---|---|
| Cellulose acetate | 100 |
| Triphenyl-acetin | 160 |

*Example 2*

| | Parts |
|---|---|
| Cellulose acetate | 100 |
| Triphenyl-acetin | 120 |
| Isomeric xylene monomethyl sulphonamides | 15–30 |

*Example 3*

| | Parts |
|---|---|
| Cellulose acetate | 100 |
| Triphenyl-acetin | 230 |

*Example 4*

| | Parts |
|---|---|
| Cellulose acetate | 100 |
| Triphenyl-acetin | 140 |
| Dibutyl tartrate | 45 |

*Example 5*

| | Parts |
|---|---|
| Ethyl cellulose | 100 |
| Triphenyl-acetin | 85 |

The following are examples of somewhat softer compositions:—

*Example 6*

| | Parts |
|---|---|
| Cellulose acetate | 100 |
| Triphenyl-acetin | 50 |
| Isomeric xylene monomethyl sulphonamides | 90 |

*Example 7*

| | Parts |
|---|---|
| Cellulose acetate | 100 |
| Triphenyl-acetin | 60 |
| Isomeric xylene monomethyl sulphonamides | 60 |

Instead of the sulphonamides an equal weight of diglycerol tetra-acetate, which is sold under the trade name "Glyakol", may be employed.

Whilst the compositions have been described with particular references to their use as coating compositions, they may also be employed for the manufacture of plastic materials of all kinds, for example, celluloid-like masses, filaments, sheets, rods, tubes, films, and other materials.

What I claim and desire to secure by Letters Patent is:—

1. Compositions of matter comprising a thermoplastic plasticizable organic base material selected from the group consisting of cellulose derivatives and polyvinyl compounds and, as plasticizer therefor, an ester of an aryl substituted aliphatic acid with a polyhydric alcohol, said alcohol consisting of an open hydrocarbon chain substituted by at least two hydroxyl substituent groups and said ester containing at least two radicles of the aryl-substituted acid.

2. Compositions of matter comprising a thermoplastic cellulose derivative and, as plasticizer therefor, an ester of an aryl substituted aliphatic acid with a polyhydric alcohol, said alcohol consisting of an open hydrocarbon chain substituted by at least two hydroxyl substituent groups and said ester containing at least two radicles of the aryl-substituted acid.

3. Compositions of matter comprising a thermoplastic organic derivative of cellulose and, as plasticizer therefor, an ester of an aryl substituted aliphatic acid with a polyhydric alcohol, said alcohol consisting of an open hydrocarbon chain substituted by at least two hydroxyl substituent groups and said ester containing at least two radicles of the aryl-substituted acid.

4. Compositions of matter comprising cellulose acetate and, as plasticizer therefor, at least 100% on the weight of the cellulose acetate of an ester of an aryl substituted aliphatic acid with a polyhydric alcohol, said alcohol consisting of an open hydrocarbon chain substituted by at least two hydroxyl substituent groups and said ester containing at least two radicles of the aryl-substituted acid.

5. Compositions of matter comprising a thermoplastic organic derivative of cellulose and, as plasticizer therefor, an ester of an aryl substituted fatty acid with a polyhydric alcohol, said alcohol consisting of a substituted open hydrocarbon chain substituted by at least two hydroxyl substituent groups and said ester containing at least two radicles of the aryl-substituted acid.

6. Compositions of matter comprising cellulose acetate and, as plasticizer therefor, at least 100% on the weight of the cellulose acetate of an ester of an aryl substituted aliphatic acid with glycerine.

7. Compositions of matter comprising cellulose acetate and, as plasticizer therefor, at least 100% on the weight of the cellulose acetate of an ester of an aryl substituted lower fatty acid with glycerine.

8. Compositions of matter comprising a thermoplastic cellulose derivative and, as plasticizer therefor, an ester of phenoxyacetic acid with a polyhydric alcohol, said alcohol consisting of an open hydrocarbon chain substituted by at least two hydroxyl substituent groups.

9. Compositions of matter comprising cellulose acetate and, as plasticizer therefor, an ester of phenoxyacetic acid with a polyhydric alcohol, said alcohol consisting of an open hydrocarbon chain substituted by at least two hydroxyl substituent groups.

10. Compositions of matter comprising cellulose acetate and at least 100% on the weight of the cellulose acetate of the tri-monophenyl acetic acid ester of glycerine.

11. Liquid coating compositions having a basis of a thermoplastic organic derivative of cellulose and containing, as plasticizer therefor, an ester of an aryl substituted aliphatic acid with a polyhydric alcohol, said alcohol consisting of an open hydrocarbon chain substituted by at least two hydroxyl substituent groups and said ester containing at least two radicles of the aryl-substituted acid.

12. Liquid coating compositions having a basis of cellulose acetate and containing, as plasticizer therefor, an ester of an aryl substituted fatty acid with glycerine.

13. Compositions of matter in the form of films, sheets, rods, tubes, filaments and like articles, comprising a thermoplastic plasticizable organic base material selected from the group consisting of cellulose derivatives and polyvinyl compounds and, as plasticizer therefor, an ester of an aryl substituted aliphatic acid with a polyhydric alcohol, said alcohol consisting of an open hydrocarbon chain substituted by at least two hydroxyl substituent groups and said ester containing at least two radicles of the aryl-substituted acid.

14. Compositions of matter in the form of films, sheets, rods, tubes, filaments and like articles, comprising a thermoplastic organic derivative of cellulose and, as plasticizer therefor, an ester of an aryl substituted aliphatic acid with glycerine.

15. Compositions of matter comprising an organic derivative of cellulose and the tri-monophenyl acetic acid ester of glycerine.

16. Compositions of matter comprising an organic derivative of cellulose and a phenoxyacetic acid ester of glycerine.

17. Compositions of matter in the form of films, sheets, rods, tubes, filaments and like articles comprising cellulose acetate and the tri-monophenyl acetic acid ester of glycerine.

WILLIAM HENRY MOSS.